United States Patent [19]
Di Stefano

[11] Patent Number: 6,000,293
[45] Date of Patent: Dec. 14, 1999

[54] MULTI-CLUTCHED TRANSMISSION

[76] Inventor: Alfonso Di Stefano, 1413 Wayburn Rd., Grosse Pointe Park, Mich. 48230

[21] Appl. No.: 09/347,072

[22] Filed: Jul. 2, 1999

Related U.S. Application Data

[63] Continuation-in-part of application No. 09/041,162, Mar. 12, 1998.

[51] Int. Cl.$^6$ .............................. F16H 3/08; F16D 19/00
[52] U.S. Cl. ........................... 74/333; 74/334; 192/87.13
[58] Field of Search ................................ 192/87.17, 48.1, 192/87.13; 74/333, 331, 334, 371, 372, 373

[56] References Cited

U.S. PATENT DOCUMENTS

| | | | |
|---|---|---|---|
| 5,297,450 | 3/1994 | MacPherson | 74/333 |
| 5,419,419 | 5/1995 | MacPherson | 192/87.13 |
| 5,845,531 | 12/1998 | Fraley et al. | 74/331 |

*Primary Examiner*—Rodney H. Bonck
*Assistant Examiner*—Tisha D. Waddell
*Attorney, Agent, or Firm*—Christopher P. Maiorana, P.C.

[57] ABSTRACT

A hydraulic transmission system includes the use of a geared cone 12 having geared rings 46–52 which mesh with respective clutches 30–36 of a drive shaft 16. The clutches 30–36 individually engage by use of hydraulic pressure directed by an input chamber 102. Engagement is accomplished when an internal parted disc 62 separates as a result of hydraulic fluid pressure and engages upon an, otherwise freewheeling, internal surface of the clutch's external dish 60. When engagement occurs, work is transferred from the input shaft 18, through the gear cone 12, to the dish 60, through the engaged disc 62 and to the drive shaft 16.

16 Claims, 3 Drawing Sheets

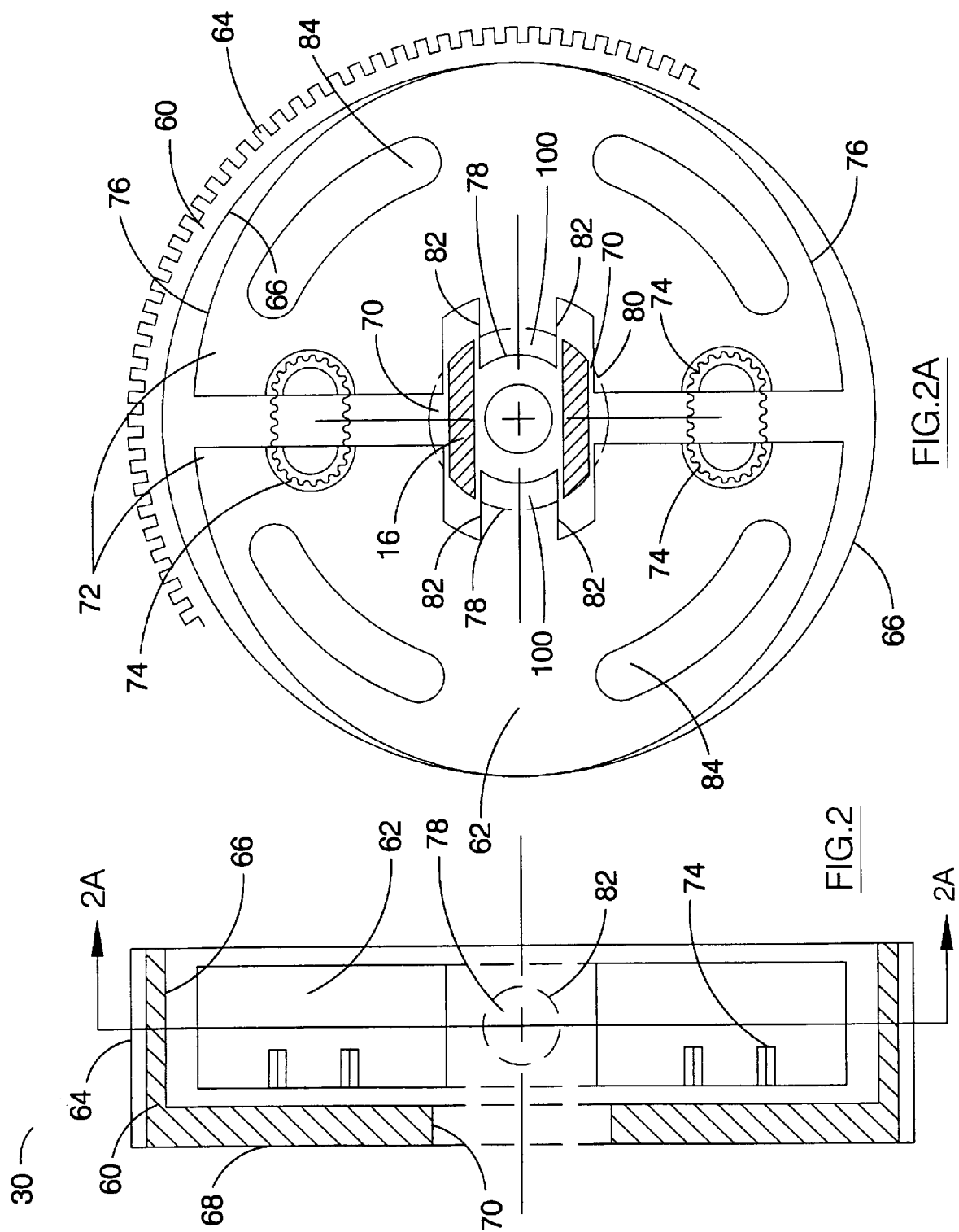

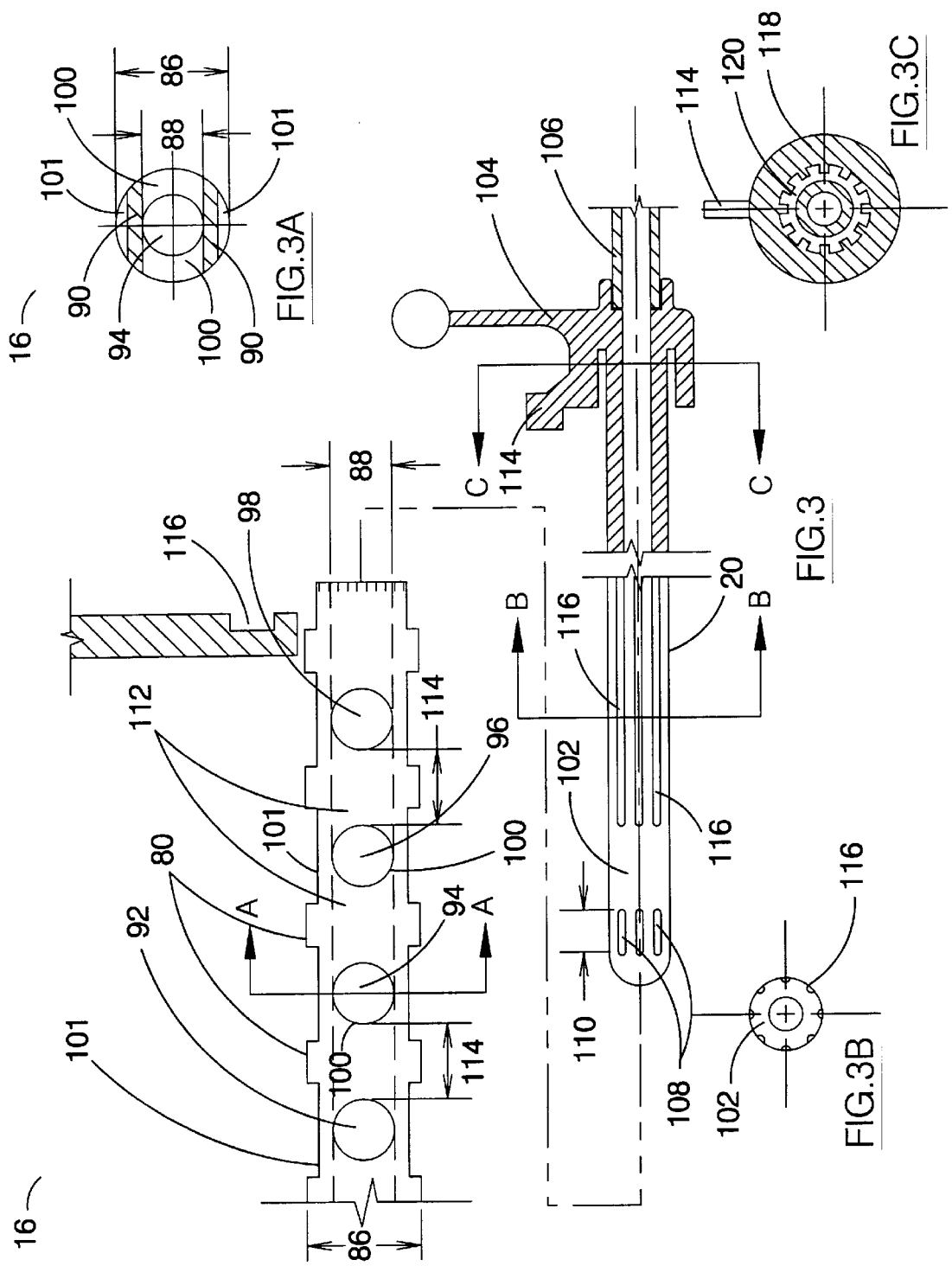

MULTI-CLUTCHED TRANSMISSION

RELATED APPLICATIONS

This application is a continuation in part of and hereby incorporates by reference application Ser. No. 09/041,162, filed on Mar. 12, 1998.

FIELD OF THE INVENTION

The present invention relates to transmissions generally and, more particularly, to a multi-clutch transmission using hydraulic pressure.

BACKGROUND OF THE INVENTION

It is known in the art to provide a transmission for converting energy derived from an engine into torque that is useable to drive the wheels of an automobile, or other vehicle, in which the transmission is implemented. A clutch is generally coupled between the drive portions and the driven portions to engage and disengage the driven portion. Many such systems use a single clutch to engage a variable number of gear pairs, each pair having a different gearing ratio. Other systems may implement a fairly complex gearing system. A disadvantage with such a conventional transmission system is that when the clutch apparatus eventually wears out, it is fairly expensive to repair the transmission. Such repairs are often included in the initial warranty of a vehicle in which the transmission is implemented, which increases the overall cost the vehicle manufacturer must absorb as an ongoing cost of doing business.

It would be desirable to reduce the initial cost of manufacturing a transmission as well as to increase the useful life of a transmission such that the overall costs associated with the transmission are reduced. It is further desirable to reduce the number of machined parts for further cost reduction purposes, along with decreasing the overall weight of the transmission in order to improve drive performance and fuel economy.

SUMMARY OF THE INVENTION

The present invention provides a multi-clutched transmission system that may be implemented in an automobile or other motor vehicle. A common input shaft is generally coupled to a gear cone having a number of rigidly attached gear rings. A number of clutches may each comprise an outer dish and an inner parted disc. The outer dishes, when not engaged, continuously free-wheel about the drive shaft at an angular velocity dictated by their respective, engaged, gear ring. A pressurized hydraulic input chamber may move within the system to engage one of the parted discs with one of the respective, free-wheeling, clutch dishes. When a particular one of the clutches is engaged, a specific torque is generated at an output drive shaft coupled to each of the parted discs of the clutches.

Objects features and advantages of the present invention include providing a multi-clutched transmission that may (i) have a reduced number of parts, (ii) extend the useful life of the transmission and (iii) provide a simplified shifting mechanism. In general, the present invention may eliminate the need for a flywheel. The present invention is an improvement to application Ser. No. 09/041,162, in that the numerous input shaft gears may be replaced with a single gear cone, thereby, reducing both the number of parts within the transmission along with the overall weight of the transmission. In addition, the outer, cylindrical, portion of the clutch may be replaced with a dish shaped portion, which may also reduce the weight of the transmission.

BRIEF DESCRIPTION OF THE DRAWINGS

These and other objects, features and advantages of the present invention will be apparent from the following detailed description and the appended claims and drawings in which:

FIG. 2 is a diagram of a clutch;

FIG. 2A is a cross sectional view of a clutch;

FIG. 3 is an exploded view of a shifter and a drive shaft;

FIG. 3A is a cross sectional view of the drive shaft;

FIG. 3B is a cross sectional view of a hydraulic input chamber; and

FIG. 3C is a cross sectional view of a shifter arm.

DETAILED DESCRIPTION OF THE PREFERRED EMBODIMENTS

Figure 1:
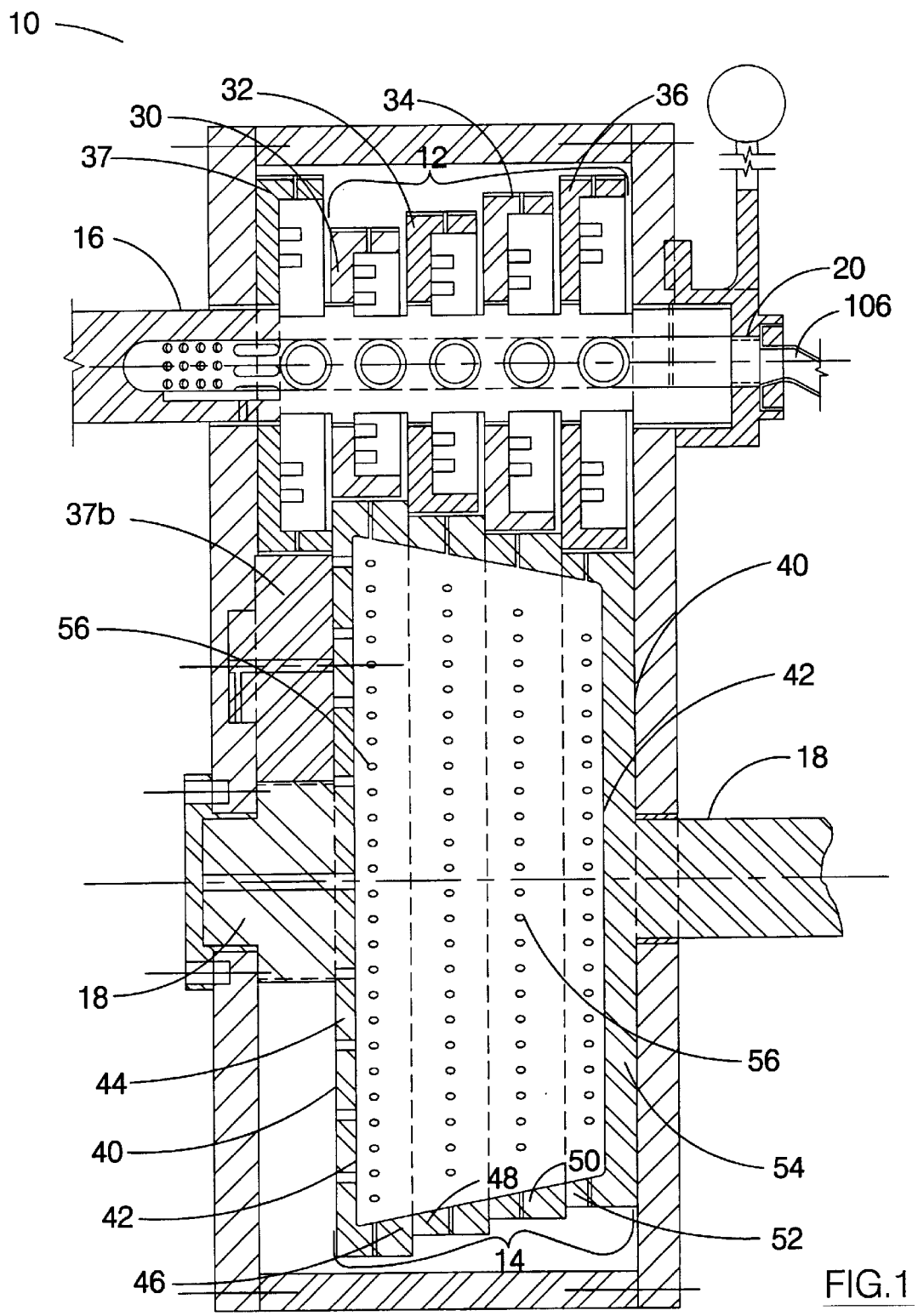
FIG. 1 is a diagram of the preferred embodiment of the present invention.

Referring to FIG. 1, a multi-clutched transmission 10 is shown in accordance with a preferred embodiment of the present invention. The transmission 10 generally comprises a clutch set 12, a gear cone 14, a drive shaft 16, an input shaft 18 and a shifter 20. The input shaft 18 can be viewed as a crank shaft powered by an automotive engine, or other external working device. The drive shaft 16 may be used to rotate the wheels of a vehicle. The clutch set 12 generally comprises a clutch 30, a clutch 32, a clutch 34, a clutch 36 and a clutch 37, concentrically located about the drive shaft 16. Although the particular example of FIG. 1 displays a four clutch set 30–36 corresponding to a four speed transmission (with the clutch 37 providing a reverse gear), the number of clutches within the set may be increased or decreased to meet the design criteria of a particular application. Additional clutches may be provided to include a single overdrive gear, or multiple overdrive gears. The clutch 37 may be used as a brake to slow or stop the transmission 10.

The gear cone 14 may be rigidly attached and concentrically located about the input shaft 18. Gear cone 14 comprises an exterior surface 40 and an interior surface 42. Surfaces 40 and 42 define a first end plate 44, a gear ring 46, a gear ring 48, a gear ring 50, a gear ring 52, and a second end plate 54. The plates 44 and 54, and the gear rings 46–52, may be rigidly attached to one-another in the order provided. Furthermore, the gear rings 46 to 52 generally become progressively smaller in diameter, thereby forming the cone shape. It should be appreciated that the exterior surface 40 may take the shape of a stepped cone as depicted in FIG. 1, or a smooth cone for ease of manufacturing. Plate 44 and plate 54 are rigidly attached, and generally perpendicular, to the input shaft 18.

The drive shaft 16 and the input shaft 18 are generally parallel, so that the clutch set 12 meshes, or comes in continuous contact, with the gear cone 14. Similarly, the clutches 30, 32, 34, and 36 generally mesh with their corresponding gear rings 46, 48, 50 and 52, ultimately forming gear ratios extending from high gear to low gear, respectively.

Gear rings 46–52 further comprise a plurality of apertures 56 which propagate from the exterior surface 40 to the interior surface 42. Apertures 56 receive hydraulic oil, or other lubricating fluid from the clutch set 12 and permits the oil to travel through the gear cone 14. Since the input shaft 18 is hollow, the oil may then travel through the shaft 18 and back to the engine for reuse. Other recirculation devices, such as an electric hydraulic pump, drawing oil from the bottom of the transmission 10 (not shown) may exist, so that the hollow feature of shaft 18 is not required.

As shown in FIG. 2, the representative clutch 30 generally comprises a dish 60, and a parted disc 62. The dish 60 further comprises an exterior perimeter surface 64, an interior perimeter surface 66, an annular surface 68, and a frictionless inside perimeter surface 70. Surface 70 mates with a frictionless surface 80 located about the drive shaft 16, as shown in FIG. 1. This mating interface may take the form of a bearing ring or other friction reducing means. The frictionless relation between surface 70 and surface 80 permits the free-wheeling of dish 60 about the drive shaft 16, which is generally necessary since dish 60 is continuously meshed with rotating gear ring 46. In order to accomplish this meshing interface, the exterior perimeter surface 64 typically takes the form of a gear surface which conforms to the gear ring 46. It is only when clutch 30 is engaged, that the dish 60 rotates in unison with drive shaft 16.

Engagement of clutch 30, shown in FIG. 2A, is accomplished by the separation of parted disc 62. This separation is accomplished by means of hydraulic pressure. Parted disc 62 comprises a plurality of disc sections 72 which, unlike dish 60, continuously rotate in unison with the drive shaft 16. Disc 62 further comprises an outer perimeter surface 76, a hydraulic oil exposure area 78, a hydraulic oil sealant area 82 and a plurality of spring mechanisms 74. The drive shaft 16 further has a plurality of ports 100 radially extending through the drive shaft 16 (to be further described in connection with FIG. 3). In order to engage the clutch 30, hydraulic oil is exerted upon the exposure area 78 through the plurality of ports 100, pushing the disc sections 72 radially outward against the resistive force of the spring mechanisms 74, thereby, causing the outer perimeter surface 76 to engage upon the interior perimeter surface 66 of the dish 60. The plurality of spring mechanisms 74 serve to bias the disc sections 72 together when hydraulic pressure is not applied, thereby assuring that the clutch 30 does not inadvertently engage. The hydraulic oil sealant area 82 sufficiently conforms to the plurality of ports 100 in order to assure sufficient hydraulic pressure is available to overcome the force of the spring mechanisms 74. A plurality of holes 84, or depressions, made upon the parted disc 62 exists in order to provide weight reduction of the transmission 10.

Referring to FIG. 3, the drive shaft 16 further comprises an outer diameter 86 and an inner diameter 88, thereby forming a shaft wall 90 extending axially down the end of shaft 16. The shaft wall 90 defines a series of hydraulic chambers 92, 94, 96 and 98 spaced between the frictionless surfaces 80. Each chamber contains the plurality of ports 100 radially placed through the shaft wall 90. The plurality of ports 100 each correspond and provide pressure to the plurality of exposure areas 78 of any one clutch 30–36.

Referring to FIG. 3A, the chamber 94 is shown and the plurality of ports 100 within the chamber is depicted as two ports. In this configuration, the plurality of disc sections 72 would also be two, see, for example, FIG. 2A. In order to engage and disengage the clutch, the plurality of disc sections 72 radially move in and out. Although the oil sealant area 82 will help guide this radial movement, the drive shaft 16 further has a plurality of channels 101, engraved into, but generally not through, the shaft wall 90 to further assist in guidance. Each one of the plurality of channels 101 is generally paired with the plurality of ports 100 so that the channel is generally parallel to the port so that the plurality of disc sections 72 mate with the drive shaft 16 in a fork-like fashion. Although the embodiment shown in FIG. 3A is an example illustrating two ports and two disc sections, one skilled in the art can now easily expand the number of ports to three or more, thereby increasing the number of clutch engagement contacts with the dish 60 accordingly.

Referring back to FIG. 3, the chambers 92–98 may receive pressure from the shifter 20. Shifter 20 comprises a hydraulic input chamber 102, a shifter arm 104, and a hydraulic feed hose 106. The input chamber 102 is rigidly attached to the shifter arm 104 and moves in a generally linear fashion down the axial length of shaft wall 90. The shaft wall 90 is concentrically located about the input chamber 102. The input chamber 102 may be implemented having a plurality of elongated openings 108 that present pressurized fluid to any one of chambers 92–98. The plurality of openings 108 each have a length 110 which is substantially parallel to drive shaft 16. The drive shaft 16 has a plurality of portions 112, each located between the plurality of ports 100, between each chamber 92–96. The portions 112 each have a length 114 which is substantially greater than the length 110. Because the length 114 is greater than the length 110, the input chamber 102 is only capable of pressurizing one of the clutches 30–36 at any one given time.

Referring to FIGS. 3 and 3B, a plurality of slots 116 may also be provided to release the pressure from any one of chambers 92–98 when shifting to another chamber. When the shifter arm 104 moves the hydraulic input chamber 102 in line with the hydraulic chamber 92, the clutch 30 is generally engaged. The result is that the single hydraulic input chamber 102 can individually engage each of the clutches 30–36 in accordance with the shifting necessary for the transmission 10 to transmit torque from the input shaft 18 to the drive shaft 16.

The shifter arm 104 provides a user input to control the shifting. As the shifter arm 104 is moved, the hydraulic input chamber 102 is engaged with only one of the chambers 92, 94, 96, or 98 of one of the clutches 30, 32, 34, or 36. When the plurality of elongated openings 108 is aligned adjacent to portions 112, the hydraulic fluid flow is effectively cut-off. The plurality of grooves 116 will then relieve any pressure contained within a previously engaged clutch of a lower gear. This eliminates the need to provide a clutch to disengage the hydraulic pressure. The hydraulic input chamber 102 may receive hydraulic fluid through the hydraulic feed hose 106. The type of hydraulic fluid should generally be sufficiently non-compressible to allow proper operation of the hydraulic chambers 92, 94, 96, or 98. Additionally, the hydraulic fluid may be selected such that it provides a lubricating effect throughout the transmission 10. A bleed back device (not shown) may be provided to allow recirculation of the fluid.

Referring to FIGS. 3 and 3C, the shifter arm 104 has a dual function as a parking brake. To serve this function, the shifter arm 104 has a protruding tab 114 which mates with the plurality of slots 116 placed within a stationary portion of transmission 10. The shifter arm further has a radially concentric skirt 118 having an inside toothed surface 120 of greater diameter than the diameter 88 (e.g., see FIG. 3A). The end of drive shaft 16 is proportionately toothed to mate with the inside toothed surface 120. When the input chamber 102 is fully inserted, the tab 114 mates with the plurality of slots 116 and the toothed surface 120 mates with the end of the drive shaft 16, thereby preventing rotation of drive shaft 16 (e.g., see FIG. 1).

It is to be understood that modification to the invention might occur to one with skill in the field of the invention within the scope of the appended claims. For example, the shifter 104 may be replaced with an automatic shifting device as known in the art.

While the invention has been particularly shown and described with reference to the preferred embodiments thereof, it will be understood by those skilled in the art that various changes in form and details may be made without departing from the spirit and scope of the invention.

I claim:

1. A transmission comprising:
   an input shaft for receiving energy from an external device;
   a gear cone in contact with said input shaft;
   a plurality of clutches each having (i) a parted disc, and (ii) a dish, wherein each dish is rotatably meshed to said gear cone, wherein said parted disc and said dish are independently meshable so that said parted disc of one of said plurality of clutches transfers energy to said drive shaft;
   a drive shaft having a shaft wall, wherein said parted disc is rotatably attached to said wall, said wall defining a plurality of hydraulic chambers, said plurality of hydraulic chambers each having a plurality of ports extending through said wall; and
   a shifter having a hydraulic input chamber, said shifter capable of pressurizing any one of said plurality of hydraulic chambers thereby engaging any one of said plurality of clutches in response to the hydraulic input chamber configured to move within each of said hydraulic chambers.

2. The transmission according to claim 1, wherein the parted disc comprises a plurality of disc sections biased together by at least one spring mechanism.

3. The transmission according to claim 2, wherein each one of said plurality of disc sections has an exposure area, said exposure area exposed to one of said plurality of ports for providing hydraulic pressure against the spring bias.

4. The transmission according to claim 3 wherein each one of said plurality of disc sections further has a hydraulic oil sealant area circumscribing said exposure area and defined by one of said plurality of ports.

5. The transmission according to claim 4 wherein said plurality of hydraulic chambers has a plurality of channels for guiding said plurality of disc sections.

6. The transmission according to claim 1 wherein said gear cone comprises a plurality of gear rings concentrically located about said input shaft, each one of said plurality of gear rings becoming progressively smaller as each one of said clutch cells becomes progressively larger.

7. The transmission according to claim 6 wherein said plurality of gear rings contain a plurality of apertures for lubrication.

8. The transmission according to claim 1 wherein said input shaft is hollow for providing recirculation of fluid back to said external device.

9. The transmission according to claim 1 wherein said hydraulic input chamber further comprises a plurality of elongated openings for pressurizing a selected one of said plurality of hydraulic chambers, and a plurality of grooves for depressurizing an unselected one of said plurality of hydraulic chambers.

10. The transmission according to claim 9, wherein said drive shaft further comprises a plurality of portions, each one of said plurality of portions located between said plurality of hydraulic chambers, said plurality of portions each having a portion length greater than length of said plurality of elongated openings.

11. The transmission according to claim 1, wherein said shifter further comprises a hydraulic feed hose and a shifter arm, said feed hose rigidly secured to said shifter arm, and said shifter arm rigidly secured to said input chamber, where said shifter arm has a parking brake.

12. The transmission according to claim 11, wherein said parking brake comprises a skirt circumventing and rigidly secured to said input chamber, said skirt having an inside toothed surface which mates with an end of said drive shaft as said tab simultaneously mates with a slot located on a stationary portion of said transmission when said input chamber is fully inserted.

13. The transmission according to claim 1, wherein said drive shaft further comprises a plurality of frictionless surfaces, said surfaces adjacent to a frictionless inside perimeter surface of said dish, thereby forming a frictionless interface which permits said dish to free-wheel about said drive shaft.

14. The transmission according to claim 13, wherein said frictionless interface is a bearing race.

15. The transmission according to claim 1, wherein one of said clutches comprises a reverse gear.

16. The transmission according to claim 15, wherein said reverse gear is configured to operate as a brake.

* * * * *